(12) United States Patent
Zhu et al.

(10) Patent No.: US 8,707,313 B1
(45) Date of Patent: *Apr. 22, 2014

(54) SCHEDULER FOR SEARCH ENGINE CRAWLER

(75) Inventors: Huican Zhu, San Jose, CA (US);
Maximilian Ibel, Pfaeffikon (CH);
Anurag Acharya, Campbell, CA (US);
Howard Bradley Gobioff, San Francisco, CA (US)

(73) Assignee: Google Inc., Mountain View, CA (US)

( * ) Notice: Subject to any disclaimer, the term of this patent is extended or adjusted under 35 U.S.C. 154(b) by 219 days.

This patent is subject to a terminal disclaimer.

(21) Appl. No.: 13/031,011

(22) Filed: Feb. 18, 2011

Related U.S. Application Data

(63) Continuation of application No. 10/882,956, filed on Jun. 30, 2004, now Pat. No. 8,042,112, which is a continuation-in-part of application No. 10/614,113, filed on Jul. 3, 2003, now Pat. No. 7,308,643.

(51) Int. Cl.
*G06F 9/46* (2006.01)
*G06F 7/00* (2006.01)

(52) U.S. Cl.
USPC .......................... 718/102; 718/103; 707/706

(58) Field of Classification Search
None
See application file for complete search history.

(56) References Cited

U.S. PATENT DOCUMENTS

| | | | | |
|---|---|---|---|---|
| 5,634,062 A | * | 5/1997 | Shimizu et al. | 715/206 |
| 5,801,702 A | * | 9/1998 | Dolan et al. | 715/854 |
| 5,832,494 A | * | 11/1998 | Egger et al. | 707/999.005 |
| 5,898,836 A | * | 4/1999 | Freivald et al. | 709/218 |
| 6,003,060 A | * | 12/1999 | Aznar et al. | 718/103 |
| 6,012,087 A | * | 1/2000 | Freivald et al. | 709/218 |
| 6,049,804 A | * | 4/2000 | Burgess et al. | 1/1 |
| 6,189,019 B1 | * | 2/2001 | Blumer et al. | 715/205 |
| 6,219,818 B1 | * | 4/2001 | Freivald et al. | 714/799 |
| 6,243,091 B1 | * | 6/2001 | Berstis | 715/839 |
| 6,263,350 B1 | | 7/2001 | Wollrath et al. | 707/206 |
| 6,263,364 B1 | | 7/2001 | Najork et al. | 709/217 |

(Continued)

FOREIGN PATENT DOCUMENTS

| | | |
|---|---|---|
| WO | WO 01/50320 A1 | 7/2001 |
| WO | WO 01/86507 A1 | 11/2001 |

OTHER PUBLICATIONS

Lagrange multiplier, Wikipedia, en.wikipedia.org/wiki/Lagrange_multiplier, Jun. 3, 2011, 11 pgs.

(Continued)

*Primary Examiner* — Camquy Truong
(74) *Attorney, Agent, or Firm* — Morgan, Lewis & Bockius LLP

(57) ABSTRACT

A search engine crawler includes a distributed set of schedulers that are associated with one or more segments of document identifiers (e.g., URLs) corresponding to documents on a network (e.g., WWW). Each scheduler handles the scheduling of document identifiers (for crawling) for a subset of the known document identifiers. Using a starting set of document identifiers, such as the document identifiers crawled (or scheduled for crawling) during the most recent completed crawl, the scheduler removes from the starting set those document identifiers that have been unreachable in each of the last X crawls. Other filtering mechanisms may also be used to filter out some of the document identifiers in the starting set. The resulting list of document identifiers is written to a scheduled output file for use in a next crawl cycle.

15 Claims, 9 Drawing Sheets

(56) References Cited

U.S. PATENT DOCUMENTS

| | | | |
|---|---|---|---|
| 6,269,370 B1 | 7/2001 | Kirsch | 707/10 |
| 6,285,999 B1 | 9/2001 | Page | 707/5 |
| 6,321,265 B1 | 11/2001 | Najork et al. | 709/224 |
| 6,336,123 B2 | 1/2002 | Inoue et al. | 707/505.1 |
| 6,351,755 B1 | 2/2002 | Najork et al. | 707/501.1 |
| 6,377,984 B1 | 4/2002 | Najork et al. | 709/217 |
| 6,404,446 B1 | 6/2002 | Bates et al. | 345/854 |
| 6,418,433 B1 | 7/2002 | Chakrabarti et al. | 707/5 |
| 6,418,452 B1 | 7/2002 | Kraft et al. | |
| 6,418,453 B1 | 7/2002 | Kraft et al. | 707/200 |
| 6,424,966 B1 | 7/2002 | Meyerzon et al. | 707/3 |
| 6,547,829 B1 | 4/2003 | Meyerzon et al. | 715/501.1 |
| 6,594,662 B1 | 7/2003 | Sieffert et al. | 707/10 |
| 6,631,369 B1 | 10/2003 | Meyerzon et al. | 707/4 |
| 6,638,314 B1 | 10/2003 | Meyerzon et al. | 715/513 |
| 6,701,350 B1 | 3/2004 | Mitchell | 709/217 |
| 6,751,612 B1 | 6/2004 | Schuetze et al. | 707/4 |
| 6,763,362 B2 | 7/2004 | McKeeth | 707/104.1 |
| 6,772,203 B1 | 8/2004 | Feiertag et al. | 709/219 |
| 6,836,768 B1 | 12/2004 | Hirsch | |
| 6,950,874 B2 | 9/2005 | Chang et al. | 709/229 |
| 6,952,730 B1 | 10/2005 | Najork et al. | 709/225 |
| 6,993,534 B2 | 1/2006 | Denesuk et al. | |
| 7,043,473 B1 | 5/2006 | Rassool et al. | 707/6 |
| 7,047,491 B2 | 5/2006 | Schubert et al. | 715/530 |
| 7,080,073 B1 | 7/2006 | Jiang et al. | 707/7 |
| 7,089,233 B2 | 8/2006 | Osias | 707/4 |
| 7,139,747 B1 | 11/2006 | Najork | 707/3 |
| 7,148,991 B2 | 12/2006 | Suzuki et al. | 358/1.5 |
| 7,171,619 B1 | 1/2007 | Bianco | 715/526 |
| 7,200,592 B2 | 4/2007 | Goodwin et al. | 707/6 |
| 7,231,606 B2 | 6/2007 | Miller et al. | 715/738 |
| 7,260,543 B1 | 8/2007 | Saulpaugh et al. | 705/1 |
| 7,299,219 B2 | 11/2007 | Green et al. | 707/2 |
| 7,308,643 B1 | 12/2007 | Zhu et al. | 715/501.1 |
| 7,310,632 B2 | 12/2007 | Meek et al. | 707/3 |
| 7,343,412 B1 | 3/2008 | Zimowski | 709/226 |
| 7,346,839 B2 | 3/2008 | Acharya et al. | 715/500 |
| 7,447,777 B1 | 11/2008 | Singh Ahuja et al. | 709/227 |
| 7,454,410 B2 | 11/2008 | Squillante et al. | |
| 7,475,069 B2 | 1/2009 | Blackman et al. | |
| 7,483,891 B2 | 1/2009 | Liu et al. | 707/5 |
| 7,565,423 B1 | 7/2009 | Fredricksen | |
| 7,725,452 B1 | 5/2010 | Randall | 707/709 |
| 7,769,742 B1 | 8/2010 | Brawer et al. | 707/709 |
| 7,966,337 B2 | 6/2011 | Blackman et al. | |
| 7,987,172 B1 | 7/2011 | Carver | |
| 8,042,112 B1 | 10/2011 | Zhu et al. | |
| 8,161,033 B2 | 4/2012 | Randall | |
| 8,180,760 B1 | 5/2012 | Carver et al. | |
| 8,392,396 B1 | 3/2013 | Carver et al. | |
| 8,407,204 B2 | 3/2013 | Carver | |
| 2002/0010682 A1 | 1/2002 | Johnson | 705/59 |
| 2002/0023158 A1 | 2/2002 | Polizzi et al. | 709/227 |
| 2002/0052928 A1 | 5/2002 | Stern et al. | 709/224 |
| 2002/0065827 A1 | 5/2002 | Christie et al. | 707/10 |
| 2002/0073188 A1 | 6/2002 | Rawson, III | 709/223 |
| 2002/0087515 A1 | 7/2002 | Swannack et al. | 707/2 |
| 2002/0099602 A1 | 7/2002 | Moskowitz et al. | 705/14 |
| 2002/0129062 A1 | 9/2002 | Luparello | 707/513 |
| 2002/0143932 A1 | 10/2002 | Quintero et al. | |
| 2002/0152201 A1 | 10/2002 | Nanavati et al. | |
| 2003/0061260 A1 | 3/2003 | Rajkumar | 709/104 |
| 2003/0126136 A1 | 7/2003 | Omoigui | |
| 2003/0131005 A1 | 7/2003 | Berry | 707/10 |
| 2003/0158839 A1 | 8/2003 | Faybishenko et al. | 707/3 |
| 2004/0044962 A1 | 3/2004 | Green et al. | 715/513 |
| 2004/0064442 A1 | 4/2004 | Popovitch | 707/3 |
| 2004/0088369 A1 | 5/2004 | Yeager et al. | |
| 2004/0128285 A1 | 7/2004 | Green et al. | 707/3 |
| 2004/0225642 A1 | 11/2004 | Squillante et al. | 707/3 |
| 2004/0225644 A1 | 11/2004 | Squillante et al. | 707/3 |
| 2005/0071766 A1 | 3/2005 | Brill et al. | 715/738 |
| 2005/0086206 A1 | 4/2005 | Balasubramanian et al. | 707/3 |
| 2005/0154746 A1 | 7/2005 | Liu et al. | 707/101 |
| 2005/0165778 A1 | 7/2005 | Obata et al. | |
| 2005/0192936 A1 | 9/2005 | Meek et al. | |
| 2005/0210008 A1 | 9/2005 | Tran et al. | |
| 2005/0216522 A1 | 9/2005 | Gomes et al. | |
| 2005/0240253 A1 | 10/2005 | Tyler et al. | |
| 2006/0036605 A1 | 2/2006 | Powell et al. | 707/10 |
| 2006/0069663 A1 | 3/2006 | Adar et al. | 707/1 |
| 2006/0277175 A1 | 12/2006 | Jiang et al. | 707/5 |
| 2009/0037393 A1 | 2/2009 | Fredricksen et al. | |
| 2010/0241621 A1 | 9/2010 | Randall | |
| 2011/0258176 A1 | 10/2011 | Carver | |
| 2012/0066576 A1 | 3/2012 | Zhu et al. | |
| 2012/0173552 A1 | 7/2012 | Zhu et al. | |

OTHER PUBLICATIONS

Pretto, A Theoretical Analysis of Google's Pagerank, Sep. 11-13, 2002, pp. 131-144.

Buyukkokten, O., "Power Browser: Efficient Web Browsing for PDAs," CHI Letters, vol. 2, Issue 1, Apr. 2000, 8 pages.

Najork, A., "High-Performance Web Crawling," COMPAQ, Systems Research Center, Sep. 26, 2001, 26 pages.

Nekrestyanov, I., "Building Topic-Specific Collections with Intelligent Agents," IS&N '99, Proc. of the 6th International Conf. on Intelligence and Services in Networks: Paving the Way for an Open Service Market, Springer-Verlag, 1999, 13 pages.

Ali, *What's Changed? Measuring Document Change in Web Crawling for Search Engines*, SPIRE 2003, LNCS 2857, 2003, pp. 28-42, Springer-Verlag, Berlin, Germany.

Arasu, Searching the Web, *ACM Transactions on Internet Technology*, ACM Transactions on Internet Technology, vol. 1, No. 1, Aug. 2001, pp. 2-43.

Baeza-Yates, *Balancing Volume, Quality and Freshness in Web Crawling*, Center for Web Research, Dept. of Computer Science, University of Chile, 2002, pp. 1-10.

Brandman, *Crawler-Friendly Web Servers*, ACM Sigmetrics Performance Evaluation Review, vol. 28, Issue 2, Sep. 2000, pp. 9-14.

Brin, *The Anatomy of a Large-Scale Hypertextual Web Search Engine*, in Proc. of the 7th International World Wide Web Conference, 1998, pp. 1-26.

Brusilovsky, *Map-Based Horizontal Navigation in Educations Hypertext*, ACM Press, Jun. 2002, pp. 1-10.

Bullot, *A Data-Mining Approach for Optimizing Performance of an Incremental Crawler*, WI '03, Oct. 13-17, 2003, pp. 610-615.

Cho, *Crawling the Web: Discovery and Maintenance of Large-Scale Web Data*, PhD Thesis, Dept. of Computer Science, Stanford University, Nov. 2001, 188 pages.

Cho, *Effective Page Refresh Policies for Web Crawlers*, ACM Transactions on Database Systems, vol. 28, No. 4, Dec. 2003, pp. 390-426.

Cho, *Efficient Crawling Through URL Ordering*, Computer Networks and ISDN Systems, vol. 30, Issues 1-7, Apr. 1998, pp. 161-172.

Cho, *Estimating Frequency of Change*, ACM Transactions on Internet Technology, vol. 3, No. 3, Aug. 2003, pp. 256-290.

Cho, *Synchronizing a Database to Improve Freshness*, MOD 2000, Dallas, TX, Jun. 2000, pp. 117-128.

Cho, *The Evolution of the Web and Implications for an Incremental Crawler*, Proceedings of the 26th VLDB Conf., Cairo, Egypt, 2000, pp. 200-209.

Coffman, *Optimal Robot Scheduling for Web Search Engines*, Tech. Rep. RR3317, 1997, 19 pages.

Douglis, *Rate of Change and Other Metrics: a Live Study of the World Wide Web*, USENIX Symposium on Internetworking Technologies and Systems, Monterey, CA, Dec. 1997, pp. I and 1-13.

Douglis, *The AT&T Internet Difference Engine: Tracking and Viewing Changes on the Web*, World Wide Web, vol. 1, No. 1, Mar. 1998, pp. 27-44.

Fetterly, *A Large-Scale Study of the Evolution of Web Pages*, WWW 2003, Budapest, Hungary, May 20-24, 2003, pp. 669-678.

Haveliwala, *Topic-Sensitive PageRank*, WWW2002, Honolulu, HI, May 7-11, 2002, 10 pages.

Henzinger, *Web Information Retrieval—an Algorithmic Perspective*, ESA 2000, LNCS 1879, 2000, pp. 1-8, Springer-Verlag, Berlin, Germany.

(56) References Cited

OTHER PUBLICATIONS

Heydon, *Mercator: A Scalable, Extensible Web Crawler*, World Wide Web, vol. 2, No. 4, Dec. 1999, pp. 219-229.

Hirai, *WebBase: a Repository of Web Pages*, Computer Networks, vol. 33, Jun. 2000, pp. 277-293.

Introna, Defining the Web: *The Politics of Search Engines*, Computer, vol. 22, Issue 1, Jan. 2000, pp. 54-62.

Jeh, *Scaling Personalized Web Search*, WWW2003, Budapest, Hungary, May 20-24, 2003, pp. 271-279.

Kamvar, *Exploiting the Block Structure of the Web for Computing PageRank*, Stanford University Technical Report, 2003, 13 pages.

Klemm, *Web Companion: A Friendly Client-Side Web Prefetching Agent*, IEEE Transactions on Knowledge and Data Engineering, vol. 11, No. 4, Jul./Aug. 1999, pp. 577-594.

Lee, *Intelligent Agents for Matching Information Providers and Consumers on the World-Wide-Web*, Proc. of the 13th Annual Hawaii International Conf. on System Sciences, 1997, 11 pages.

Najork, *Breadth-First Search Crawling Yields High Quality Pages*, WWW10, May 10-12, 2001, Hong Kong, pp. 114-118.

Pandey, *Monitoring the Dynamic Web to Respond to Continuous Queries*, WWW2003, Budapest, Hungary, May 20-24, 2003, pp. 659-668.

Shkapenyuk, *Design and Implementation of a High-Performance Distributed Web Crawler*, ICDE '02, San Jose, CA, Feb. 26-Mar. 1, 2002, pp. 357-368.

Suel, *Odissea: A Peer-to-Peer Architecture for Scalable Web Search and Information Retrieval*, WebDB, San Diego, CA, Jun. 12-13, 2003, pp. 1-6.

Wolf, *Optimal Crawling Strategies for Web Search Engines*, WWW 2002, Honolulu, Hawaii, May 7-11, 2002, pp. 136-147.

\* cited by examiner

SCHEDULER FOR SEARCH ENGINE CRAWLER

RELATED APPLICATIONS

This application is a continuation of U.S. patent application Ser. No. 10/882,956, now U.S. Pat. No. 8,042,112, filed Jun. 30, 2004, which was a continuation-in-part of U.S. patent application Ser. No. 10/614,113, filed Jul. 3, 2003, now U.S. Pat. No. 7,308,643, both of which are incorporated by reference herein in their entireties.

This application is related to U.S. patent application Ser. No. 10/882,955, "Document Reuse In a Search Engine Crawler," filed Jun. 30, 2004, which application is incorporated by reference herein in its entirety.

TECHNICAL FIELD

The disclosed embodiments relate generally to search engine crawlers for use in computer network systems, and in particular to a scheduler for a search engine crawler.

BACKGROUND

A search engine is a tool that identifies documents, typically stored on hosts distributed over a network, that satisfy search queries specified by users. Web search engines work by storing information about a large number of web pages (hereinafter also referred to as "pages" or "documents"), which they retrieve from the World Wide Web (WWW). These documents are retrieved by a web crawler. The web crawler follows links found in crawled documents so as to discover additional documents to download. The contents of the downloaded documents are indexed, mapping the terms in the documents to identifiers of the documents. The resulting index is configured to enable a search to identify documents matching the terms in search queries. Some search engines also store all or part of the document itself, in addition to the index entries. When a user submits a search query having one or more terms, the search engine searches the index for documents that satisfy the query, and provides a listing of matching documents, typically including for each listed document the URL, the title of the document, and in some search engines a portion of document's text deemed relevant to the query.

While web pages can be manually selected for crawling, this becomes impracticable as the number of web pages grows. Moreover, to keep within the capacity limits of the crawler, automated selection mechanisms are needed to determine not only which web pages to crawl, but which web pages to avoid crawling. For instance, as of the end of 2003, the WWW is believed to include well in excess of 10 billion distinct documents or web pages, while a search engine may have a crawling capacity that is less than half as many documents.

SUMMARY

A search engine crawler includes a set of schedulers that are associated with one or more segments of document identifiers (e.g., URLs) corresponding to documents on a network (e.g., WWW). Each scheduler handles the scheduling of document identifiers (for crawling) for a subset of the known document identifiers. Using a starting set of document identifiers, such as the document identifiers crawled (or scheduled for crawling) during the most recent completed crawl, the scheduler removes from the starting set those document identifiers that have been unreachable in one or more previous crawls. Other filtering mechanisms may also be used to filter out some of the document identifiers in the starting set.

Priority scores are computed for each remaining document identifier based on predetermined criteria (e.g., a page importance score of the document). In some embodiments, the predetermined criteria include a boost function that boosts the priority scores of pages matching predefined boost criteria. The document identifiers are sorted in accordance with their priority scores, and then the document identifiers having the N top priority scores are selected for scheduling, where N is a predefined or previously selected value. N is typically less than the crawling capacity of a corresponding web crawler, because a portion of the web crawler's capacity is reserved for crawling documents discovered during the course of a crawl.

In some embodiments, the set of N document identifiers is further reduced by applying a set of predefined capacity limits to the N document identifiers. For instance, the set of predefined capacity limits may include limits on the number of documents in any one domain, limits on the number of documents having a common host limits on documents having particular file types, and so on.

In some embodiments, the resulting list of document identifiers is written to a scheduled output file for use in a next crawl cycle. The document identifiers rejected on the basis of low priority scores, capacity limits and the like are optionally written to an unscheduled output file, which may be used, for instance, as a source of document identifiers for a low priority background crawl.

In some embodiments, a scheduler system for a search engine crawler includes a memory for storing a set of document identifiers corresponding to documents on a network and associated status data collected during one or more previous crawls by the search engine crawler. A plurality of schedulers are configured to select a subset of the document identifiers for crawling. The schedulers are configured to compute priority scores for at least some of the subset of document identifiers and to schedule for crawling at least one of the subset of document identifiers based on the priority scores and status data.

In some embodiments, a method of scheduling a search engine crawler includes selecting a first subset of document identifiers from a set of document identifiers corresponding to documents on a network. Priority scores are computed for the subset of document identifiers. The subset of document identifiers are then scheduled for crawling based on the priority scores and status data collected during one or more previous crawls by the search engine crawler.

In some embodiments, a computer-readable medium includes instructions, which when executed by a processor in a scheduler system for a search engine crawler, cause the processor to perform various operations. These operations include selecting a first subset of document identifiers from a set of document identifiers corresponding to documents on a network. Priority scores for the subset of document identifiers are computed. The subset of document identifiers are scheduled for crawling based on the priority scores and status data collected during one or more previous crawls by the search engine crawler.

DESCRIPTION OF EMBODIMENTS

Overview of Crawler System With Centralized URL Scheduler

Figure 1A:
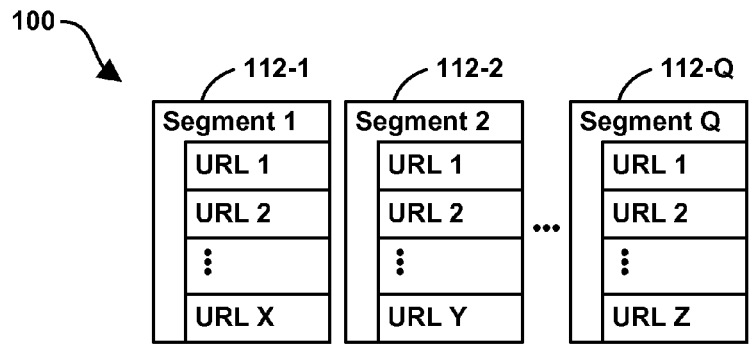
FIG. 1A illustrates a data structure for storing URLs.

FIG. 1A illustrates a data structure 100 for storing document identifiers (e.g., web page URLs) into segments 112. In some embodiments, the data structure 100 includes a sequence of segments 112a, ..., 112n. Each segment 112 includes a number of URLs representing a portion of the web page address space that has been (or will be) used by a web crawler system.

Figure 1B:
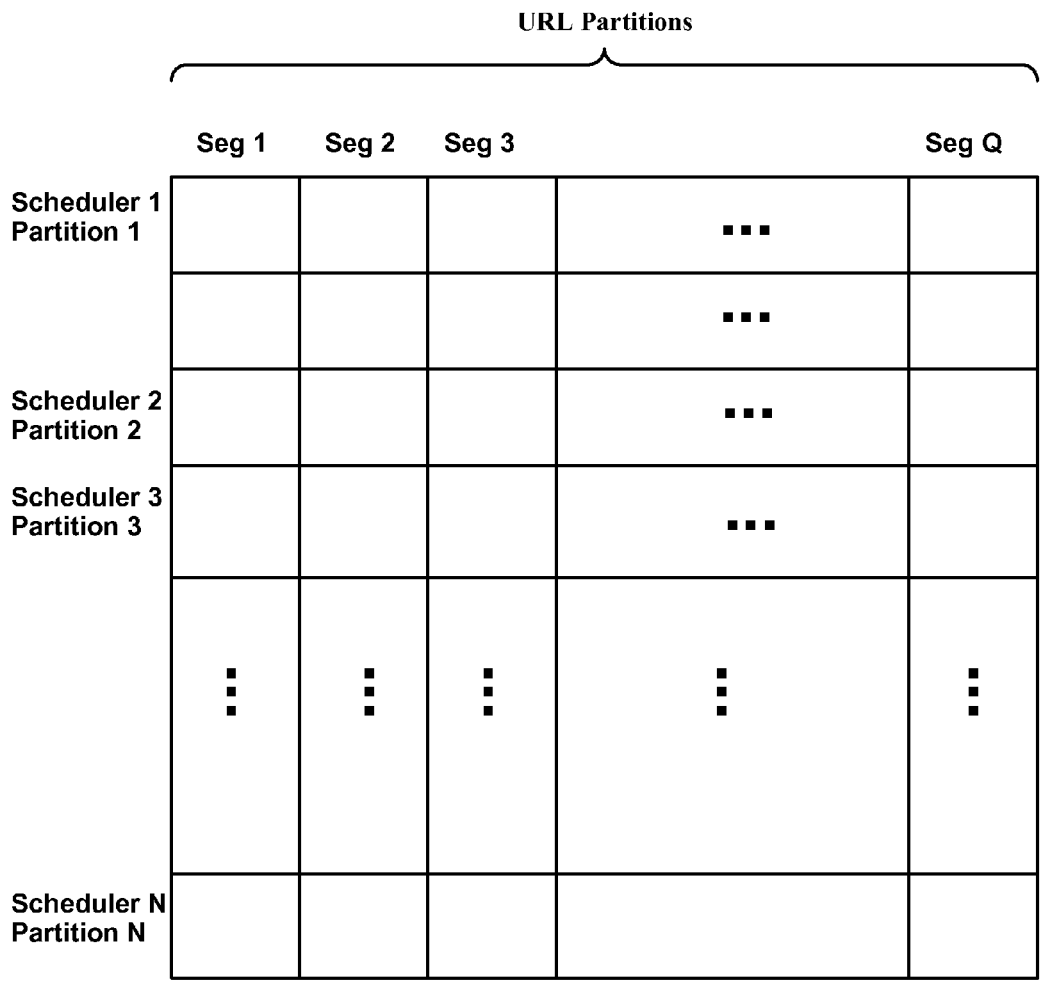
FIG. 1B illustrates the assignment of schedulers to URL partitions containing one or more segments.

FIG. 1B illustrates the assignment of a set of URL schedulers to segments of a data structure. Note that each scheduler 1, ..., N is assigned to a URL partition, which includes a portion of each of the segments 1 to Q. For Example, scheduler 1 will schedule URLs contained in segments 1, ..., Q, which collectively form URL partition 1. The schedulers 302 are described more fully with respect to FIG. 3.

Figure 2:
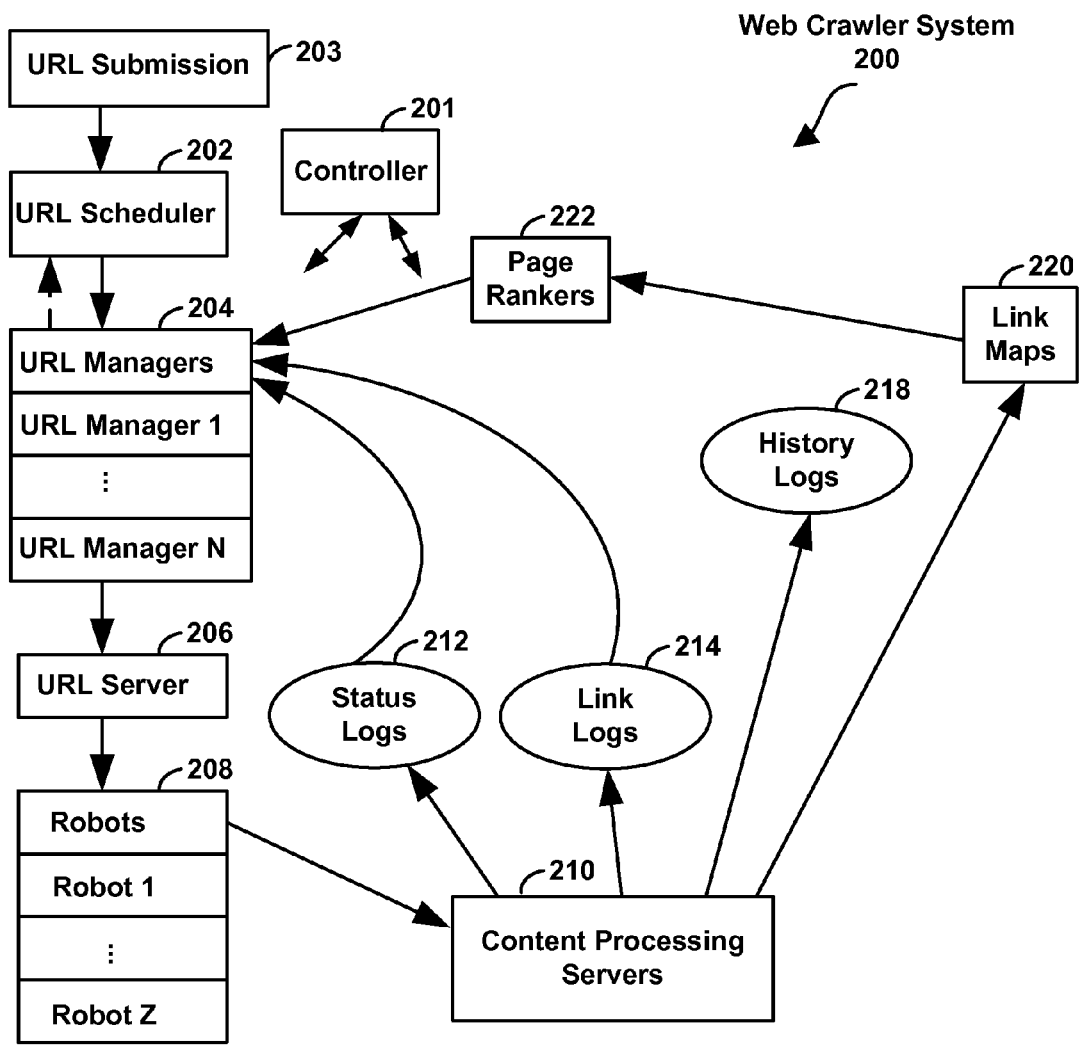
FIG. 2 is a block diagram illustrating a web crawler system for processing crawled web pages including a central URL scheduler.

FIG. 2 is a simplified block diagram of a web crawler system 200, which crawls URLs stored in the data structure 100. In some embodiments, there are a number of different URL sources used to populate the data structure 100, including direct submission 203 of URLs by users of the search engine system 200, or submissions (e.g., time-based submissions) from third parties who have agreed to provide links to documents as they are published, updated or changed. Another source of URLs is through discovery of outgoing links on crawled pages.

The URL scheduler 202 determines which URLs will be crawled in each epoch, and stores that information in the data structure 100. In some embodiments, the URL scheduler 202 allocates URLs to segments of the data structure, where the segments correspond to the epochs. In these embodiments, the URL scheduler 202 also determines which URLs within each segment are to be crawled, as will be described in more detail below.

The controller 201 selects a segment 112 for crawling. The selected segment 112 is referred to hereinafter as the "active segment." Typically, at the start of each epoch, the controller 201 selects a different segment 112 as the active segment so that, over the course of several epochs, all the segments 112a, ..., n are selected for crawling in a round-robin manner.

A query-independent score (also called a document score) is computed for each URL by URL page rankers 222. The page rankers 222 compute a page importance score for a given URL. In some embodiments, the page importance score is computed by considering not only the number of URLs that reference a given URL but also the page importance score of such referencing URLs. Page importance score data is provided to URL managers 204, which pass a page importance score for each URL to URL server 206, robots 208, and content processing servers 210. One example of a page importance score is PageRank, which is used the page importance metric used in the Google search engine. An explanation of the computation of PageRank is found in U.S. Pat. No. 6,285,999, which is incorporated by reference herein in its entirety.

From time to time, the URL server 206 requests URLs from the URL managers 204. In response, the URL managers 204 provide the URL server 206 with URLs obtained from data structure 100. The URL server 206 then distributes URLs from the URL managers 204 to crawlers 208 (hereinafter also called "robots" or "bots") to be crawled. A robot 208 is a server that retrieves documents at the URLs provided by the URL server 206. The robots 208 use various known protocols to download pages associated with URLs (e.g., HTTP, HTTPS, Gopher, FTP, etc.).

Pages obtained from URLs that have been crawled by robots 208 are delivered to content processing servers 210, which perform a number of tasks. In some embodiments, these tasks include indexing the content of the pages, generating records of the outbound links in the pages, detecting duplicate pages, and creating various log records to record information about the crawled pages. In one embodiment, these log records are stored in log files, including link logs 214, history logs 218, and status logs 212. The link logs 214 include a link record for each document obtained from a URL by a robot 208 and passed to the content processing servers 210. Each link log 214 record identifies all the links (e.g., URLs, also called outbound links) that are found in the document associated with the record and the text that surrounds the link. The information in the link logs 214 is used by the content processing servers 210 to create link maps 220. The records in the link map 220 are similar to records in the link logs 214 with the exception that text is stripped and the records are keyed by a "fingerprint" of the normalized value of the source URL. In some embodiments, a URL fingerprint is a 64-bit integer determined by applying a hash function or other one way function to a URL. The bit-length of the URL fingerprint may be longer or shorter than 64 bits in other embodiments. The records in each link map 220 may optionally be sorted or keyed by a fingerprint. The link maps 220 are used by the page rankers 222 to adjust the page importance score of URLs within data structure 100. Preferably, such page importance scores persist between epochs.

URL Scheduling

Overview of Web Crawler System With URL Schedulers

Figure 3:
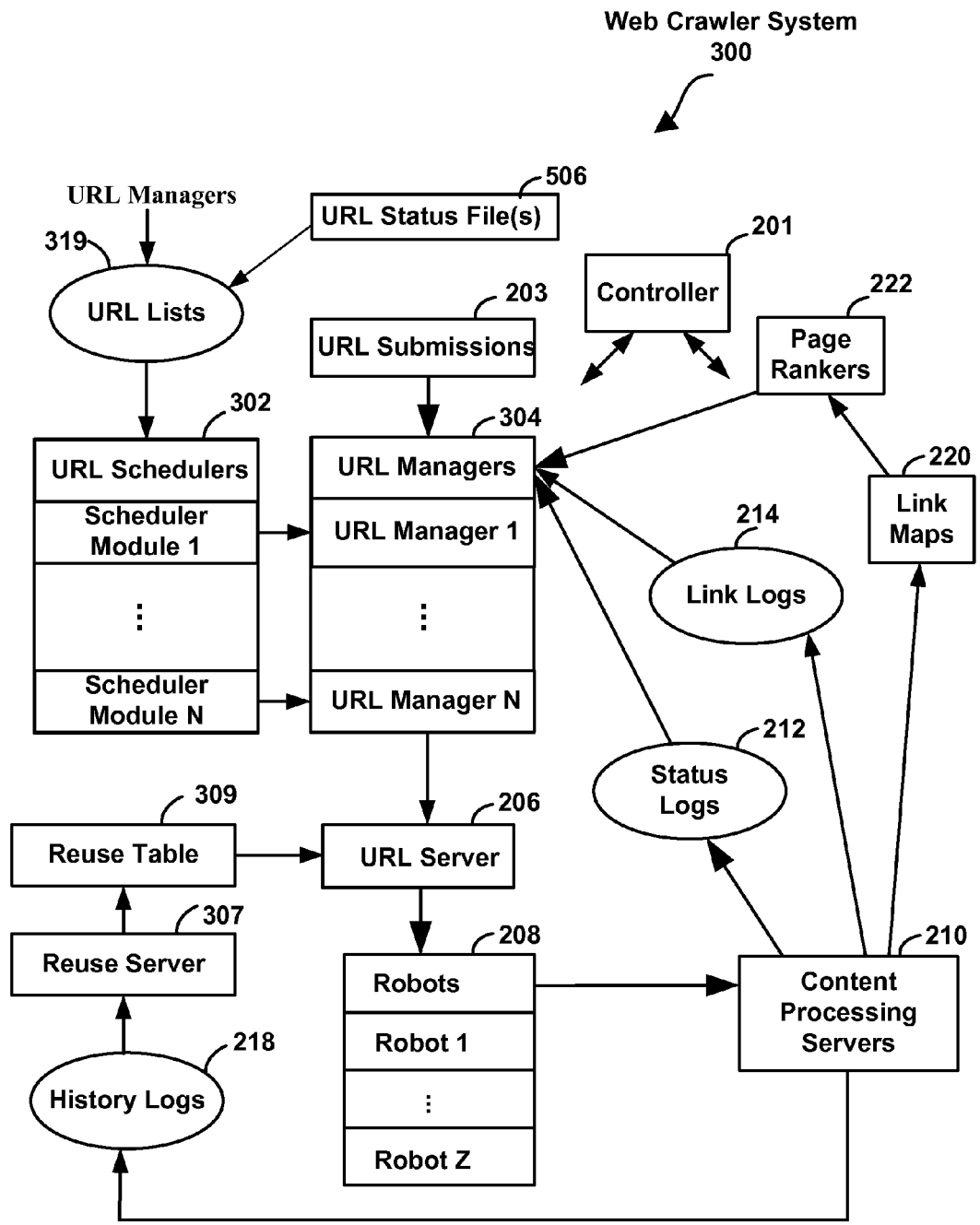
FIG. 3 is a block diagram illustrating a web crawler system for processing web pages including a set of URL schedulers.

FIG. 3 is a simplified block diagram illustrating a web crawler system 300 for processing web pages including URL schedulers 302. Note that portions of the web crawler system 300 not directly involved in the operation of the URL schedulers 302 and URL managers 304 are represented by the content processing servers 210. Also, note that the controller 201, page rankers 222, content processing servers 210, URL server 206 and robots 208 operate in a manner previously described with respect to the web crawler system shown in FIG. 2. In contrast to the web crawler system 200, which employs a centralized URL scheduler 202, the web crawler system 300 employs a number of URL schedulers 302-1, ..., 302-N, which are run prior to each segment being crawled. Each scheduler 302 is coupled to a corresponding URL manager 304-1, ..., 304-N, which is responsible for managing the distribution of URLs to URL server 306. The URL schedulers 302 are adapted to receive URL lists 319 containing URLs to be scheduled for crawling. The URL lists 319 are generated, at least in part, from URL status tables 505, as described below.

URL Reuse

Referring to the lower half of FIG. 3, a reuse server 307 populates a reuse table 309 with historical data received from history logs 218 generated by the content processing servers 210 during previous crawls. The reuse table 309 identified URLs that are to be retrieved from data repositories rather than downloaded from the WWW in the next crawl. In some embodiments, the decision to reuse a URL is based on whether the content of the document corresponding to the URL has changed in the last N crawls. For example, if a content checksum for a document remains unchanged over the last N crawls, then the URL associated with the document will be included in the reuse table 309 along with the number of days since the document was last modified. In other embodiments, a limit is placed on the number of times a particular URL is reused. For example, after a URL has been reused three times in a row it is no longer a candidate for reuse. In still other embodiments, the top x % (e.g., 2%) of URLs based on page importance scores will not be reused because of the importance that the search index contain the most recent version of these documents, as well as the high probability that their content will change between crawls. Table I below is an example of a reuse table 309 for a scheduler system 300.

TABLE I

Reuse Table Example

| URL Record No. | URL Fingerprint (FP) | Reuse Type | If Modified Since ... |
|---|---|---|---|
| 1 | 2123242 | REUSE | |
| 2 | 2323232 | REUSE IF NOT MODIFIED SINCE | Feb. 5, 2004 |
| 3 | 3343433 | DOWNLOAD | |
| . | . | . | . |
| . | . | . | . |
| . | . | . | . |

In some embodiments, the reuse table 309 includes a record for each URL and each URL record includes at least three fields. The first field includes the URL fingerprint (FP) and the second field includes a Reuse Type flag indicating whether the URL associated with the URL FP is to be reused, or downloaded, or conditionally reused. If the Reuse Type flag is set to REUSE, then the document associated with the URL FP will be retrieved from a data repository. If the Reuse Type flag is set to DOWNLOAD, then the document will be downloaded in the next crawl cycle. If the Reuse Type Flag is set to REUSE IF NOT MODIFIED SINCE, the third field specifies a date or a date and time or a timestamp value. When the Reuse Type Flag is set to this conditional value, and the document associated with the URL was "modified since" the time and date specified in the reuse table 309, then the document will be downloaded by a robot in the next crawl cycle. Otherwise, the document associated with URL will be retrieved form a data depository. The reuse/download scheduling process is described more fully with respect to FIGS. 4A-4D.

Figure 4A:
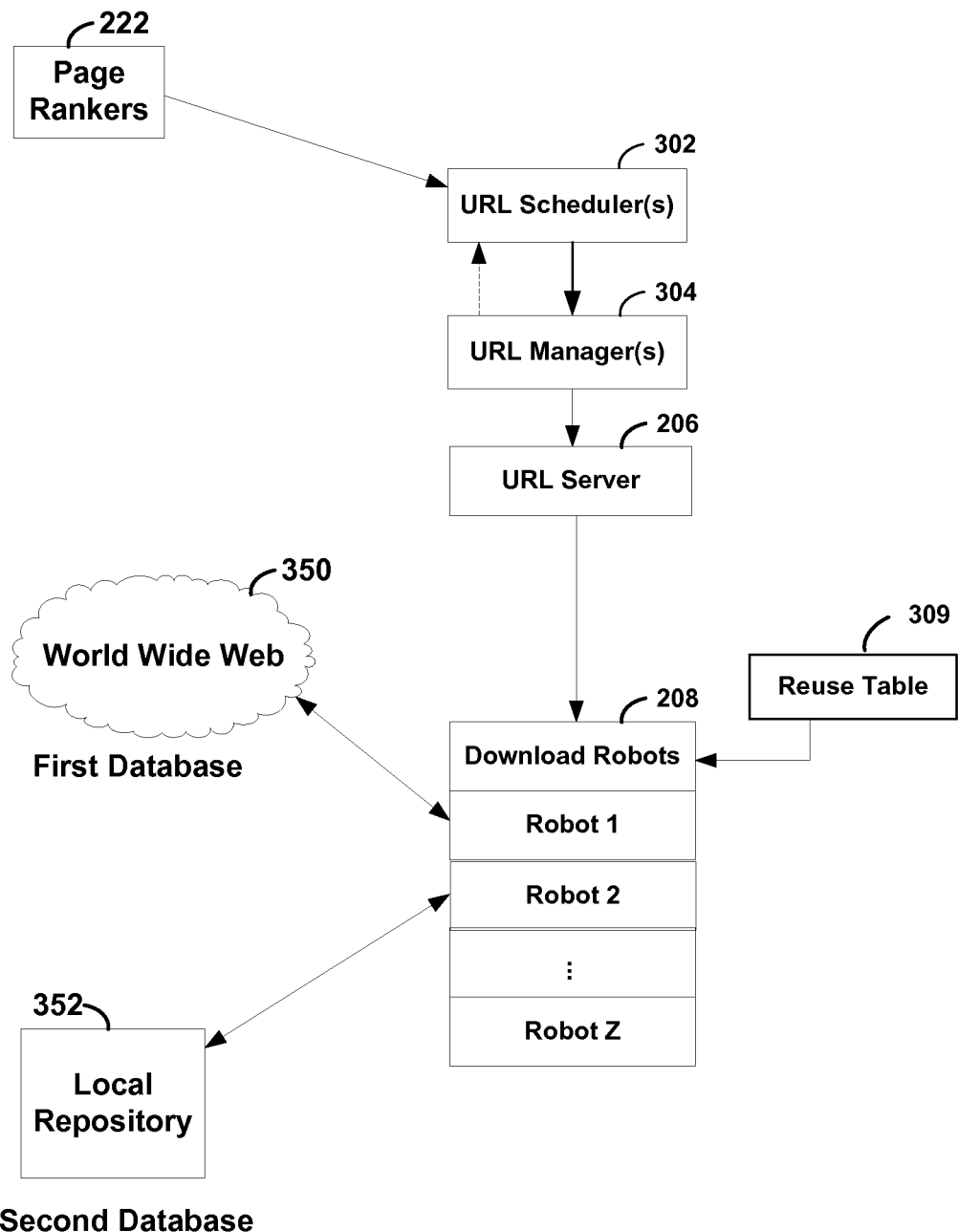
FIG. 4A is a conceptual block diagram of a web crawler system.

FIG. 4A is a conceptual diagram of a web crawler system. All of the components of the system have been previously described, except the two databases 350, 352. The first database 350 is the World Wide Web or other network of documents, and thus is not part of the web crawler system. The second database 352 is a local repository of documents previously downloaded from the first database 350, during either the current or previous crawls. The robots 208 crawl scheduled documents, the addresses or URLs of which are provided to the robots by the URL Server 206. Each scheduled document is crawled either from the first database 350 or the local second database 352, based on information specified in the reuse table 309.

Figure 4B:
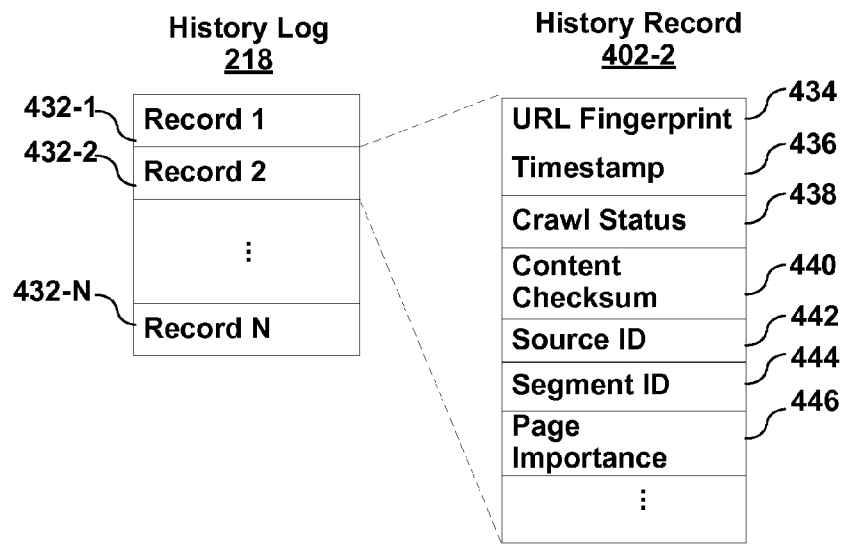
FIG. 4B is a block diagram of a history log file.

FIG. 4B depicts a portion of the data structure of a history log file 218 and a history log record 432. In some embodiments, each history log record 432 contains only a subset of the fields shown in FIG. 4B, and may contain other fields as well. In the embodiment shown, the history log file 218 contains a set of history log records 432, each of which stores information concerning a particular crawl attempt of a particular document. Each history record 432 includes the following fields:

URL fingerprint 434, which is obtained by applying a hash function or fingerprint function to the document's URL;

timestamp 436, indicating the date and time of the download or crawl attempt;

crawl status 438, indicating whether the crawl attempt was a success or resulted in an error;

content checksum 440, which contains a checksum of the contents of the page if the crawl attempt was successful;

source ID 442, indicating whether the document was reused (i.e., accessed from the local document repository), or downloaded (or attempted to be downloaded);

segment identifier 444, which indicates the segment to which the document is assigned; and page importance 446, which is the page importance score assigned to the document (by the page rankers) at the time of the crawl attempt.

Some of the fields of the history record 432 are unused, or undefined, in the event that the crawl attempt is unsuccessful, or if the crawl attempt is a reuse of the document from a local document repository.

Reuse/Download Scheduling Process

Figure 4C:
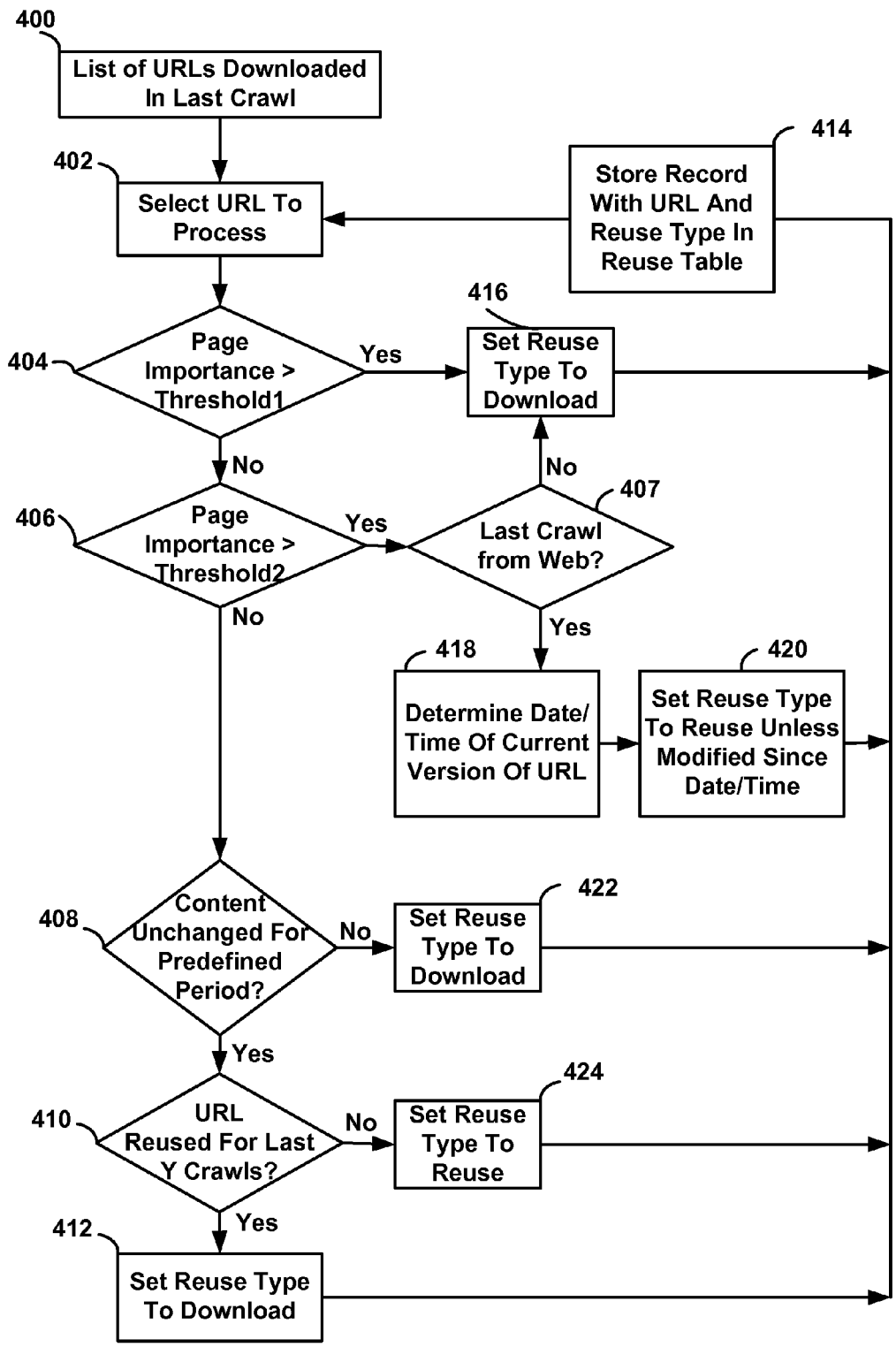
FIG. 4C is a flow diagram of a process for determining which URLs to be download and which to reuse from a database of previously downloaded documents when crawling a set of URLs.

FIG. 4C is a flow diagram of a process for determining whether to download (e.g., from the WWW) or reuse (e.g., retrieve from a repository) a document corresponding to a URL in the next crawl. In some embodiments, the process is performed by the reuse server 307 once per M URL segments. As shown in Table I, each URL is associated with a URL record stored in the reuse table 309. Each URL record includes a Reuse Type flag for determining whether a document will be downloaded or retrieved from a data repository in the next crawl cycle.

The process begins by retrieving 400 from a URL manager 304 a list of URLs downloaded in the last crawl and selecting 402 a URL to process. If 404 the page importance score for the URL is greater than a first predetermined threshold (e.g., a threshold associated with the top x % of page importance scores), then its Reuse Type flag is set 416 to DOWNLOAD and stored 414 in the reuse table 309. The URL page importance score used in steps 404 and 406 can be obtained from the page rankers 222, or can be retrieved from the URL history log 218, or it can be obtained by obtaining the historical page importance score for the URL for a predefined number of prior crawls and then performing a predefined filtering function on those values to obtain the URL page importance score.

If the page importance score of the URL is not above the first predefined threshold, its page importance score is compared against a second predetermined threshold. If 406 the page importance score is greater than the second predetermined threshold (e.g., in the top y % of page ranks), and the last crawl of the document was from the web (i.e., was not a reuse of the document from a local document repository) 407, then the date and time of the current version of the URL is determined 418, the Reuse Type flag is set 420 to REUSE UNLESS MODIFIED SINCE and the determined date and time are also stored in Reuse table entry for the URL. When this URL is scheduled for crawling, the robot assigned this URL will establish a connection to the host to determine the date and time of the last update to the document at the URL. If the update date and time are after the date and time specified in the reuse table, the robot downloads the document from the host server. Otherwise, the robot reuses the document from a document repository.

On the other hand, if 406 the page importance score is greater than the second predetermined threshold (e.g., in the top y % of page importance scores), and the last crawl of the document was not from the web (i.e., was a reuse of the document from a local document repository) 407, then the Reuse Type Flag is set 416 to Download. After setting the Reuse Type flag, the URL record is stored 414 in the reuse table 309 and another URL is selected 402 from the URL list for processing.

If 404, 406, the page importance score for the URL does not exceed the predetermined thresholds, and if 408 the content of the document associated with the URL has changed at least one over a predefined period (e.g., the 45 day period ending at the time of the last scheduled crawl of the URL), then the Reuse Type flag is set 422 to DOWNLOAD. In some embodiments, the history logs 218 include a content checksum 440 for the content of a document each time it is downloaded by a robot. By comparing the content checksums for two or more of the downloads of the URL during a predefined period of time, the reuse server can determine if the document at the URL has changed during that predefined period. After setting the Reuse Type flag, the URL record is stored 414 in the reuse table 309 and another URL is selected 402 from the URL list for processing.

If 408 the content of the URL has remained unchanged for the entire predefined period, and if 410 the URL was reused in all of the last Y crawls, then the Reuse Type flag is set 412 to DOWNLOAD. Otherwise, the Reuse Type flag is set 424 to REUSE. For example, if Y=3, then a URL is reused at most three time in a row. On the other hand, once a document qualifies for reuse, it will be reused for Y successive crawls, after which the reuse server will enabling the document to be downloaded. After setting the Reuse Type flag, the URL record is stored 414 in the reuse table 309 and another URL is selected 402 from the URL list for processing.

In other embodiments, various aspects of the reuse scheduling process may differ from those shown in FIG. 4C and described above. For instance, in some embodiments, all known URLs are assigned a Reuse Type of either Download or Reuse. In these embodiments, the Reuse Type of Reuse If Not Modified Since is not used.

Reuse Server

Figure 4D:
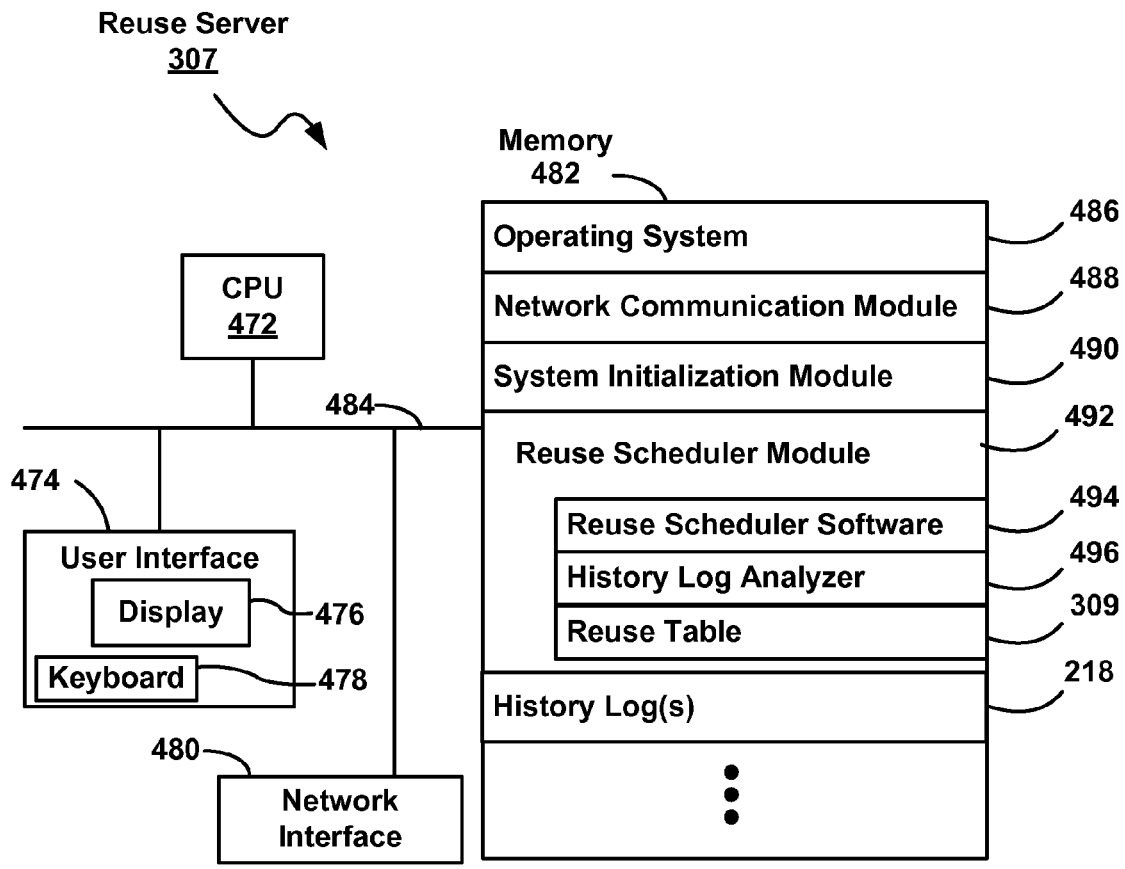
FIG. 4D is a block diagram of a reuse server for a web crawler system.

FIG. 4D is a block diagram of a computer system configured to operate as the reuse server 307. Since reuse scheduling is performed only occasionally, the computer system 307 may well be used for other tasks as well. For the purposes of the present discussion, however, we are concerned only about the computer system while it is configured for use as a reuse scheduler 307.

The reuse scheduler 307 includes one or more processing units (CPU's) 472, one or more network or other communications interfaces 480, memory 482, and one or more communication buses 484 for interconnecting these components. The system 307 may optionally include a user interface 474, for instance a display 476 and a keyboard 478. Memory 912 may include high speed random access memory and may also include non-volatile memory, such as one or more magnetic disk storage devices. Memory 482 may include mass storage that is remotely located from the central processing unit(s) 472.

The memory 482 stores an operating system 486 (e.g., Linux or Unix), a network communication module 480, a system initialization module 490 and a reuse scheduler module 492. The operating system 486 generally includes procedures for handling various basic system services and for performing hardware dependent tasks. The network communication module 488 is used for connecting the system 307 to other servers or computers in the web crawler system 300 (FIG. 3) and possibly to other servers or computers via one or more communication networks (wired or wireless), such as the Internet, other wide area networks, local area networks, metropolitan area networks, and the like. The system initialization module 490 initializes other modules and data structures stored in memory 484 required for the appropriate operation of the system 307.

The operation of the reuse scheduler module 492 was described above with respect to FIG. 4C. The reuse scheduler module 492 includes reuse scheduler software 494, which is used to implement the main logic of the reuse server, a history log analyzer 496, and the reuse table 309. The history log analyzer 496 is configured to analyze the information in one or more history log file(s) 218 to determine (A) whether the content of a particular URL has remain unchanged for a predefined or specified period of time, and (B) whether a particular URL has been reused Y times in a row.

URL FP Mapping and Schedule Output File Format

Figure 5:
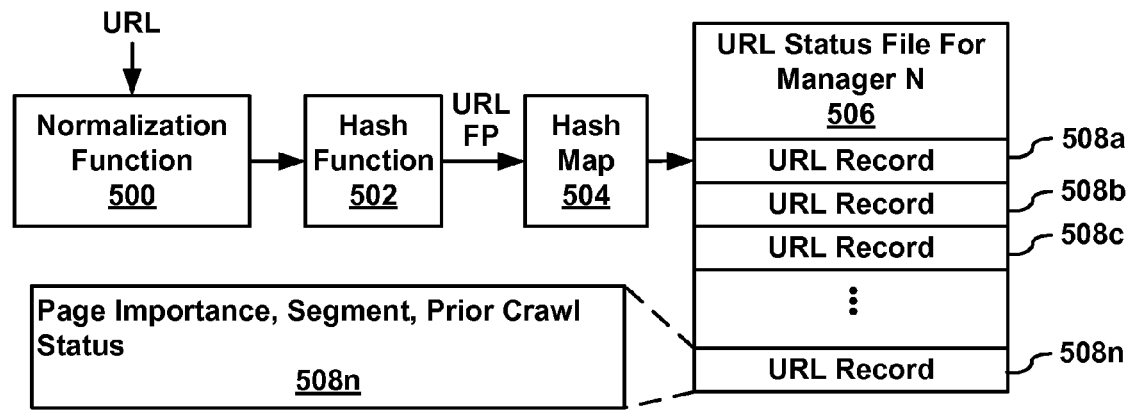
FIG. 5 illustrates a URL fingerprint hashing process for accessing records in a URL status file.
Figure 8:
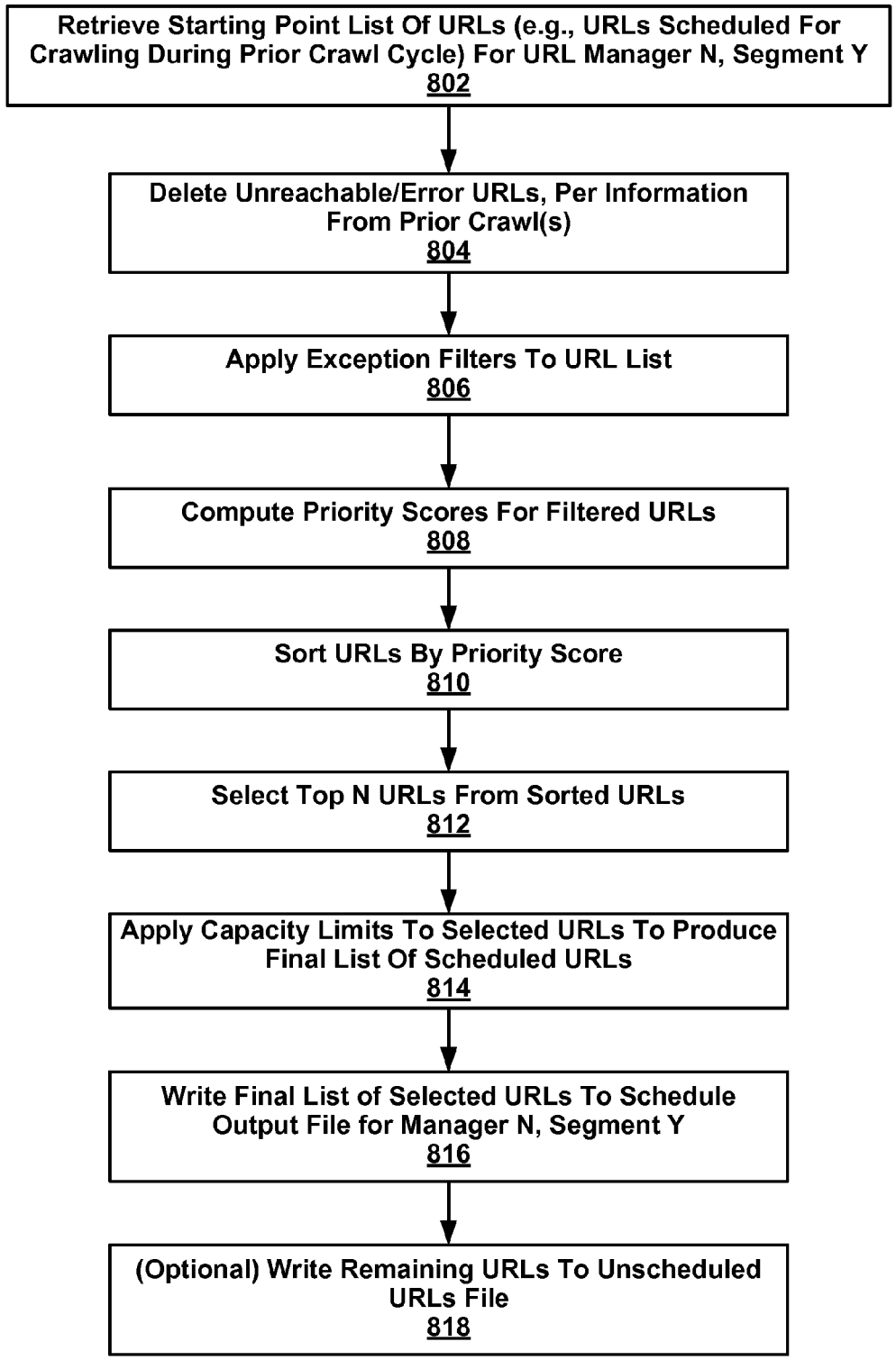
FIG. 8 is flow diagram of a URL scheduler process.

FIG. 5 illustrates a URL FP hashing process for accessing records containing data used in the distributed scheduler process described with respect to FIG. 8. In some embodiments, the URL FP is an N-bit number (where N is a value or a bit length) that is generated from the corresponding URL by first normalizing 500 the URL text (e.g., converting host names to lower case, and canonicalization—rewriting the URL, if necessary, in canonical form) and then passing the normalized URL text through a hash function 502 to produce a URL fingerprint. The URL fingerprint is then passed through a hash map 504, which ensures that the URL fingerprint is well distributed across the entire space of possible numbers. The hash map 504 maps the URL fingerprint to a corresponding record 508 in the URL status file 506. In some embodiments, the URL records 508 include a page importance score, a prior crawl status and a segment ID. In other embodiments, URL records 508 can include more or fewer fields than shown in FIG. 5, as needed, depending upon the architecture of the system 300.

A page importance score is assigned to a URL FP at the time the document download operation is performed or attempted. The page importance score can change over time, as the set of pages having links to the page corresponding to URL FP changes, and as the page importance scores of these referring pages change. The prior crawl status can include multiple fields, including without limitation an error field and an unreachable field. The error field records information associated with a download error. An example of an error is "HTTP Error 4xx," which may indicate that the web page does not exist, or that access is not authorized, or some other error. In some embodiments, the error field indicates the number of consecutive times an attempt to download the URL resulted in an error. The unreachable field records information associated with a URL being unreachable (e.g., because the host server is busy). For example, the unreachable field can include the number of consecutive times the URL was unreachable in previous crawls. The segment ID identifies the particular crawl segment associated with the URL FP at the time that the document download operation was performed or attempted.

In some embodiments, information about document download errors and unreachable URLs is stored in one or more separate files (hereinafter called URL Error Files). For example, for each complete segment crawl, a first file may be created for each URL scheduler that indicates all the URLs scheduled by that URL scheduler which resulted in downloading error, and a second file may be created for each URL scheduler that indicates all the URLs scheduled by that URL scheduler that were determined to be unreachable. The information in these files is then used by the URL scheduler while determining which URLs to schedule for downloading in a next crawl cycle.

Figure 6:
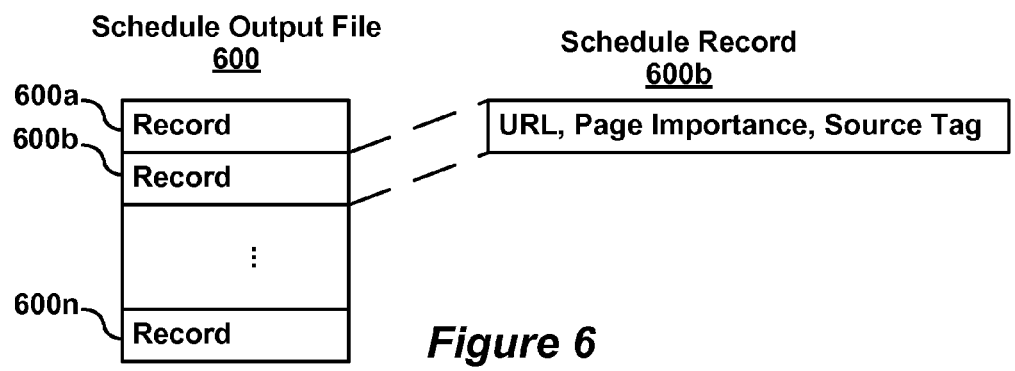
FIG. 6 illustrates the format of a schedule output file.

FIG. 6 illustrates the format of a schedule output file 600. In some embodiments, the result of the scheduler process shown in FIG. 8 is a schedule output file 600, which is provided by a scheduler 302 to its corresponding URL manager 304. The scheduler output file 600 includes records 600a, ..., 600n, each identifying a URL to be crawled and, optionally, including additional information (e.g., page importance score, source tag, etc.).

URL Scheduler Computer System

Figure 7:
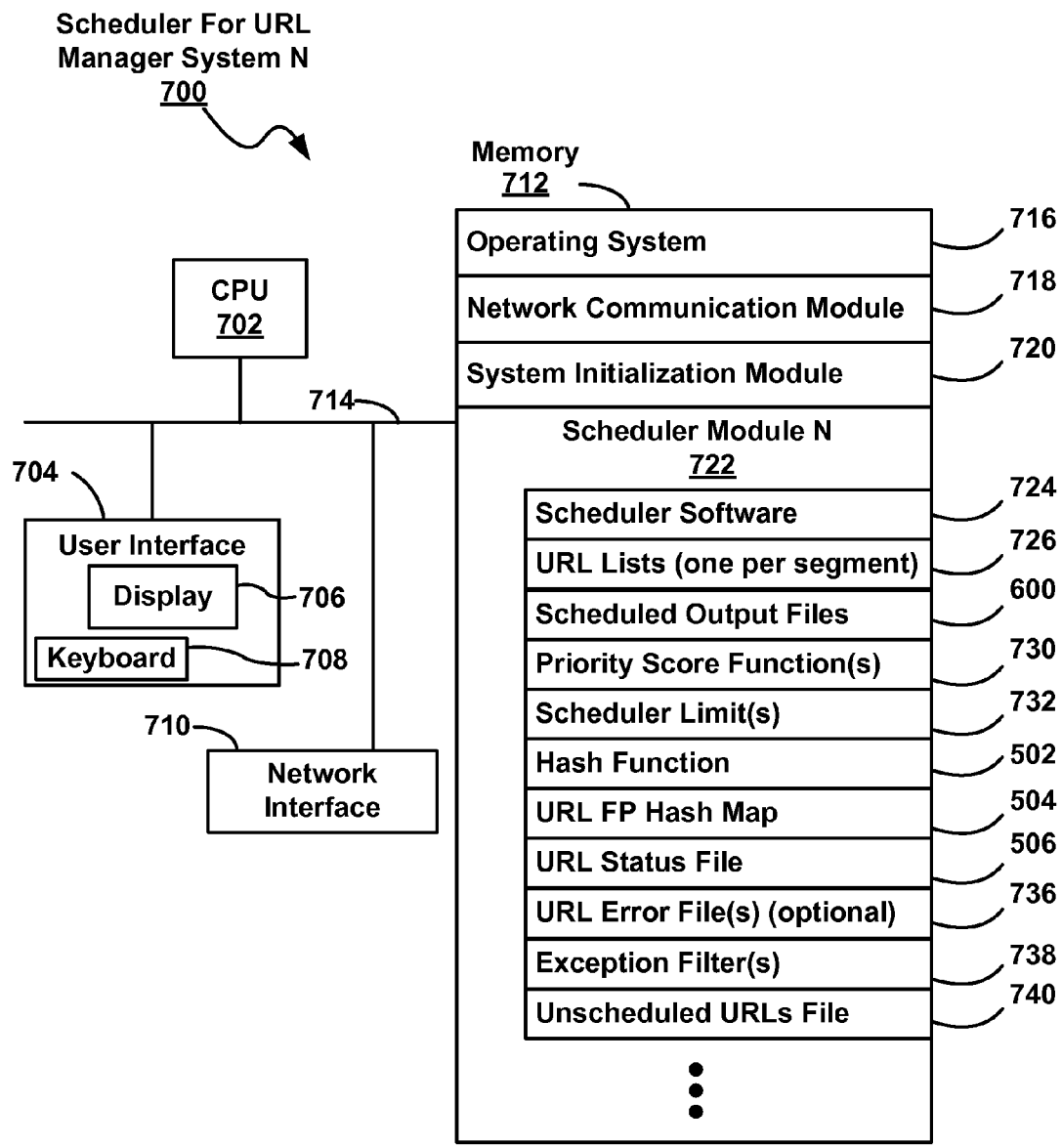
FIG. 7 is a block diagram of a URL scheduler for a URL manager system.

FIG. 7 is a block diagram of a computer system 700 configured to operate as one of the URL schedulers. Since URL schedule is performed only occasionally, the computer system 700 may well be used for other tasks as well. For the purposes of the present discussion, however, we are concerned only about the computer system 700 while it is configured for use as a URL scheduler.

The URL scheduler 700 includes one or more processing units (CPU's) 702, one or more network or other communications interfaces 710, memory 712, and one or more communication buses 714 for interconnecting these components. The system 700 may optionally include a user interface 704, for instance a display 706 and a keyboard 708. Memory 712 may include high speed random access memory and may also include non-volatile memory, such as one or more magnetic disk storage devices. Memory 712 may include mass storage that is remotely located from the central processing unit(s) 702. Memory 712, or one or more of the storage devices (e.g., one or more non-volatile storage devices) in memory 712, comprises a non-transitory computer readable storage medium.

The memory 712 stores an operating system 716 (e.g., Linux or Unix), a network communication module 718, a system initialization module 720 and a URL scheduler module 722. The operating system 716 generally includes procedures for handling various basic system services and for performing hardware dependent tasks. The network communication module 718 is used for connecting the system 700 to other servers or computers in the web crawler system 300 (FIG. 3) and possibly to other servers or computers via one or more communication networks (wired or wireless), such as the Internet, other wide area networks, local area networks, metropolitan area networks, and the like. The system initialization module 720 initializes other modules and data structures stored in memory 714 required for the appropriate operation of the system 700.

The memory 712 also includes a URL scheduler module 722, which is used to implement various aspects of the disclosed embodiments, as described below with respect to FIG. 8. The scheduler module 722 includes scheduler software 724, which is used to implement the various aspects of the scheduler system 700, together with various data structures and functions. In some embodiments, the data structures and functions include a URL list 726 (e.g., one per segment), a schedule output file 600, a priority score function 730, scheduler limit(s) 732, a hash function 502, a URL FP hash map 504, a URL status file 506, exception filter(s) 738, and a Unscheduled URLs file 740. The data structures may optionally include one or more URL Error Files 736, for storing information about errors and unreachable URLs encountered in one or more prior crawl epochs. The use of these data structures and functions is described with respect to FIG. 8.

Scheduler Operation

FIG. 8 is a flow diagram of a URL scheduling process implemented by a scheduler module N corresponding to a URL manager N and segment Y. For each segment Y to be crawled, the scheduler 724 retrieves 802 a starting point URL list 726 from URL manager N for segment Y. The URL list 726 includes URLs in segment Y that were scheduled for crawling during a prior crawl cycle. As described with respect to FIG. 5, the URLs are passed through the hash function 733 to generate URL fingerprints which are passed through the hash map 734 to access URL records in the URL status file 506. At this point in the process, the prior crawl status fields (e.g., unreachable and error fields) in the URL status file 506 can be used to identify URLs that were unreachable in each of the last X crawls (e.g., the last two crawls) or that associated with download errors in each of the last X crawls. Alternately, in some embodiments prior crawl error information is retrieved from separate URL Error Files. The identified URLs are removed 804 from the starting URL list 726. In some embodiments, one or more exception filters 738 can be applied 806 to the URL list 726 to eliminate URLs. For example, in some embodiments URLs associated with customer complaints or spammers, as well as URLs that do not belong in segment Y, are deleted from the URL list 726. In other embodiment, more or fewer exception filters are applied to the URL list, to remove URLs from the initial URL list.

After deleting URLs from the URL list 726, the page importance scores for the remaining URLs are used to compute 808 priority scores using a priority score function 730, which in some embodiments is given by $$\text{Priority Score}_i = \text{page\_importance}_i * \text{boost factor}, \quad (1)$$

where the subscript i denotes an ith URL and the boost factor is a scalar (e.g., a number larger or smaller than 1.0) that is used to demote or promote the priority score of the URL. For example, the boost factor can be used to promote URLs of homepages of major companies (e.g., Fortune 100) or popular news sites (e.g., CNN). Note that more or fewer priority scores can be computed using a variety of priority functions, as needed, depending upon the architecture of the scheduling system 300.

After computing 808 the priority scores for the URLs, the URLs are sorted 810 by priority score and the top N sorted URLs are selected 812 as candidates to be crawled. In some embodiments, the number N may be a predefined number, related to the URL handling capacity of the web crawling system during each epoch. For example, N may be equal to a predefined percentage (e.g., 65% or 75% or 80%) of the URL handling capacity of the web crawling system during an epoch.

In some embodiments, one or more scheduler limits 732 (e.g., capacity limits) can be applied 814 to the selected URLs. Some examples of scheduler limits 732 include values that represent the maximum number of URLs that can be scheduled on a host-by-host, domain and/or group basis. For example, there may be hardware or software limits on the number of URLs that a particular host machine can process in a crawl cycle or epoch. There may also be limits on the number of URLs having a particular domain name or that are associated with a particular file type (e.g., CGI files). Note that any number and types of scheduler limits 732 can be applied to the selected URLs, as needed, depending upon the architecture of the scheduler system 300.

After applying 814 the scheduler limits 732 (if any), the selected URLs are written 816 to a schedule output file 728, as shown in FIG. 6. In some embodiments, only URLs are written 816 to the schedule output file 728. In other embodiments, the URLs are written 816 to the schedule output file 728, together with other information (e.g., page importance score, source tag, etc.), as needed, depending upon the architecture of the scheduler system 300. In some embodiments, the URLs that were not written 816 to the schedule output file 728 because they were eliminated due to the scheduler limits 732, are optionally written 818 to an unscheduled URL file 740.

Referring again to FIG. 3, the schedule output file 728 produced by the URL scheduler of FIG. 7 is used by a corresponding to URL manager 304. In particular, the URLs listed in the schedule output file 728 are provided to the URL server 306 over the course of a crawl epoch, for either downloading or reuse, as specified by the reuse table 309. Additional URLs discovered during the course of the crawl are also provided by the URL manager 304 to the URL server 306 using additional mechanisms that are not the subject of this document.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A scheduler system for a search engine crawler, comprising:
    a memory for storing a set of document identifiers corresponding to documents on a network and associated status data collected during one or more previous crawls by the search engine crawler; and
    a plurality of schedulers configured to select a subset of the document identifiers for crawling, at least some of the schedulers configured to compute priority scores for the subset of document identifiers and to schedule for crawling at least a portion of the subset of document identifiers based on the priority scores and status data;
    wherein the scheduling includes removing from the subset one or more document identifiers that were unreachable in a plurality of consecutive prior crawls or had download errors in a plurality of consecutive prior crawls; and
    wherein each priority score is computed as a product of a respective page importance and a respective boost factor, the respective boost factor being a scalar that is used to demote or promote the priority score of the respective document identifier.

2. The system of claim 1, wherein the document identifiers stored in the memory are divided into multiple segments, and wherein each of a plurality of schedulers is configured to schedule a partition of the document identifiers that includes document identifiers assigned to each of the multiple segments.

3. The system of claim 1, further comprising an unscheduled document identifier file for storing the document identifiers not scheduled for crawling by one or more of the plurality of schedulers.

4. The system of claim 1, wherein each of the plurality of schedulers is configured to sort document identifiers by priority scores and schedule a predefined number N of the sorted document identifiers having highest priority scores.

5. A method of scheduling a search engine crawler using a scheduler system, comprising:
    at a server with one or more processors and memory, and one or more programs stored in the memory that execute on the one or more processors:
    selecting a first subset of document identifiers from a set of document identifiers corresponding to documents on a network;
    computing priority scores for the first subset of document identifiers;
    forming a second subset of document identifiers based on the priority scores and status data collected during one or more previous crawls by the search engine crawler and by removing from the first subset one or more document identifiers identified as unreachable in a plurality of prior crawls or associated with download errors in a plurality of prior crawls; and
    scheduling for crawling the second subset of document identifiers;
    wherein each priority score is computed as a product of a respective page importance and a respective boost factor, the respective boost factor being a scalar that is used to demote or promote the priority score of the respective document identifier.

6. The method of claim 5, further comprising:
    applying at least one exception filter to at least a plurality of the document identifiers to identify document identifiers to be excluded from a next crawl.

7. The method of claim 5, further comprising: removing document identifiers from the second subset in accordance with one or more scheduler limits.

8. The method of claim 5, further comprising:
    storing unscheduled document identifiers for crawling at a later time.

9. The method of claim 5, further comprising:
    sorting the first subset of document identifiers by priority scores; and
    scheduling a portion of the sorted document identifiers to be crawled.

10. The method of claim 5, wherein the document identifiers are Uniform Resource Locators (URLs) and the documents are located on the World Wide Web (WWW).

11. A non-transitory computer-readable medium having stored thereon instructions, which when executed by a processor in a scheduler system for a search engine crawler, cause the processor to perform the operations of:
- selecting a first subset of document identifiers from a set of document identifiers corresponding to documents on a network;
- computing priority scores for the first subset of document identifiers;
- forming a second subset of document identifiers based on the priority scores and status data collected during one or more previous crawls by the search engine crawler and by removing from the first subset one or more document identifiers identified as unreachable in a plurality of prior crawls or associated with download errors in a plurality of prior crawls; and
- scheduling for crawling the second subset of document identifiers;
- wherein each priority score is computed as a product of a respective page importance and a respective boost factor, the respective boost factor being a scalar that is used to demote or promote the priority score of the respective document identifier.

12. The non-transitory computer-readable medium of claim 11, further comprising instructions for applying at least one exception filter to at least a plurality of the document identifiers to identify document identifiers to be excluded from a next crawl.

13. The non-transitory computer-readable medium of claim 11, further comprising instructions for removing document identifiers from the second subset in accordance with one or more scheduler limits.

14. The non-transitory computer-readable medium of claim 11, further comprising instructions for storing unscheduled document identifiers for crawling at a later time.

15. The non-transitory computer-readable medium of claim 11, further comprising
- instructions for selecting one or more document identifiers whose corresponding documents will be reused based on historical status data; and
- instructions for retrieving and indexing documents corresponding to the selected document identifiers, wherein the documents are retrieved from a repository distinct from web hosts corresponding to the document identifiers.

* * * * *